(12) United States Patent
Vankerkhove

(10) Patent No.: US 8,294,904 B2
(45) Date of Patent: Oct. 23, 2012

(54) FIZEAU LENS HAVING ASPHERIC COMPENSATION

(75) Inventor: Steven J Vankerkhove, Webster, NY (US)

(73) Assignee: Corning Incorporated, Corning, NY (US)

( * ) Notice: Subject to any disclaimer, the term of this patent is extended or adjusted under 35 U.S.C. 154(b) by 346 days.

(21) Appl. No.: 12/468,376

(22) Filed: May 19, 2009

(65) Prior Publication Data

US 2009/0296103 A1 Dec. 3, 2009

Related U.S. Application Data

(60) Provisional application No. 61/130,242, filed on May 29, 2008.

(51) Int. Cl.
G01B 11/02 (2006.01)

(52) U.S. Cl. ........................................................ 356/515

(58) Field of Classification Search .................. 356/519, 356/511–515
See application file for complete search history.

(56) References Cited

U.S. PATENT DOCUMENTS

| | | | | |
|---|---|---|---|---|
| 5,004,346 A * | 4/1991 | KuMichael | .................... | 356/513 |
| 5,488,477 A * | 1/1996 | de Groot | ........................ | 356/514 |
| 5,757,493 A | 5/1998 | VanKerkhove | | |
| 5,797,493 A | 8/1998 | Watson | | |
| 5,818,632 A * | 10/1998 | Stephenson | .................... | 359/565 |
| 5,864,402 A * | 1/1999 | Stenton | .......................... | 356/515 |
| 6,312,373 B1 | 11/2001 | Ichihara | | |
| 6,359,692 B1 * | 3/2002 | de Groot | ........................ | 356/512 |
| 6,771,375 B2 * | 8/2004 | Zanoni | ............................ | 356/512 |
| 7,123,365 B1 * | 10/2006 | Schulte | ........................... | 356/512 |
| 7,283,204 B2 | 10/2007 | Wegmann | | |
| 7,342,667 B1 * | 3/2008 | Freimann et al. | ............. | 356/515 |
| 7,522,292 B2 * | 4/2009 | Doerband | ....................... | 356/601 |
| 7,619,722 B2 * | 11/2009 | Moizumi et al. | ............... | 356/124 |
| 7,933,025 B2 * | 4/2011 | De Groot | ....................... | 356/514 |
| 2002/0024732 A1 * | 2/2002 | Hamano et al. | ................ | 359/557 |
| 2002/0063961 A1 * | 5/2002 | Hamano et al. | ................ | 359/557 |
| 2006/0187430 A1 * | 8/2006 | Dodoc et al. | ..................... | 355/53 |
| 2006/0274325 A1 * | 12/2006 | Hetzler et al. | ................. | 356/521 |

* cited by examiner

*Primary Examiner* — Tarifur Chowdhury
*Assistant Examiner* — Jonathan Hansen
(74) *Attorney, Agent, or Firm* — Walter M. Douglas

(57) ABSTRACT

An imaging system for obtaining interferometric measurements from a sample spherical surface has a light source for providing an incident light beam, a beamsplitter disposed to direct the incident light beam toward the sample spherical surface and to direct a test light reflected from the sample spherical surface and a reference light reflected from a reference spherical surface toward an interferometric imaging apparatus. There is a lens assembly in the path of the incident light beam, with at least one lens element, wherein one of the at least one lens elements has an aspheric surface and wherein one of the at least one lens elements further provides the reference spherical surface facing the sample spherical surface. A reference plate is temporarily disposed in the path of the incident light beam for measuring the aspheric surface itself and is removable from the path of the incident light beam for obtaining interferometric measurements from the sample spherical surface.

10 Claims, 7 Drawing Sheets

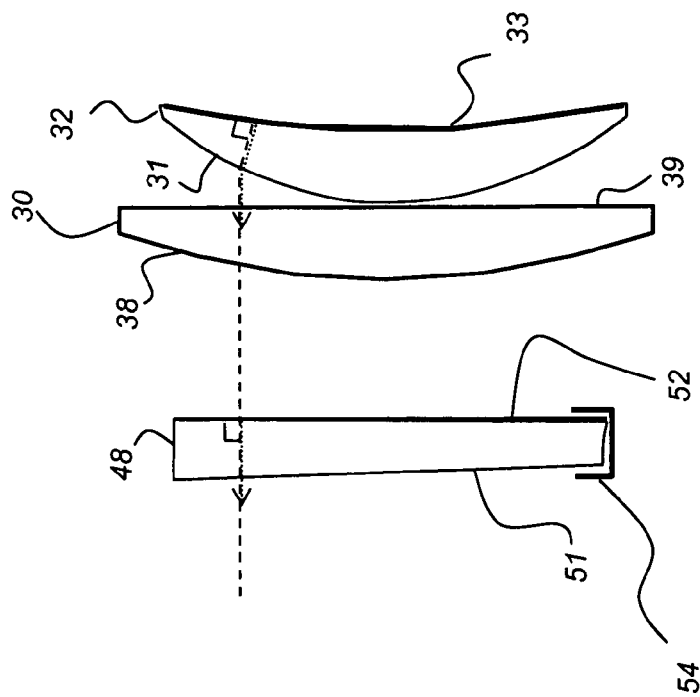
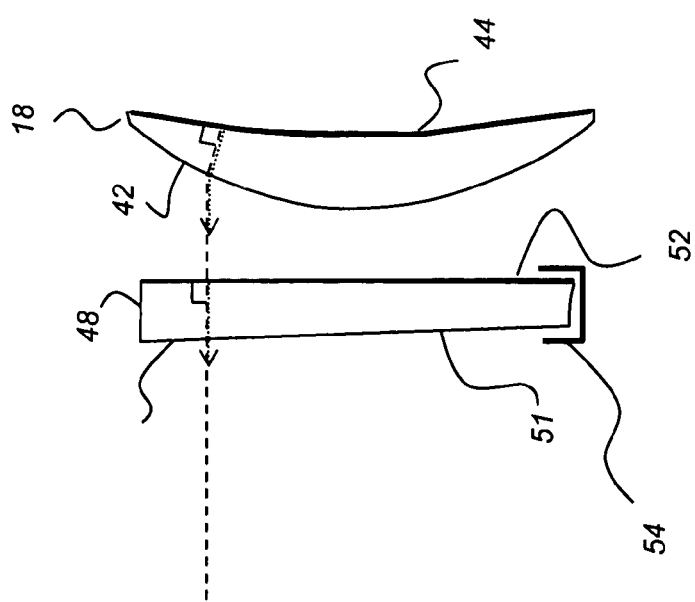
*FIGURE 6B*
*FIGURE 6A*

FIZEAU LENS HAVING ASPHERIC COMPENSATION

CROSS-REFERENCE TO RELATED APPLICATIONS

This application claims the benefit of priority under 35 U.S.C. § 119(e) of U.S. Provisional Application Ser. No. 61/130,242 filed on May 29, 2008.

FIELD

This invention generally relates to optical metrology and more particularly relates to an apparatus and method for design and use of an aspheric lens to provide a spherical waveform in a Fizeau interferometer.

BACKGROUND

In interferometry, highly precise surface measurement is obtained for various types of optical components using interference fringes that are generated between light reflected from a reference surface and light from a surface under test. The Fizeau interferometer is one instrument of this type that is advantaged for measurement of various optical surfaces, particularly for spherical or planar surfaces having relatively large diameters.

The schematic block diagram of FIG. 1 shows components of a conventional Fizeau interferometer 10. A laser 12 or other highly coherent light source directs light through a beamsplitter 14 and towards a test surface 20, the sample surface to be measured, as well as toward a reference surface provided within Fizeau optics 18. A collimator 16 and Fizeau optics 18 condition the path of light directed toward the target and reference surfaces and bend this light toward the proper angles for the surface being measured. The optical path of target and reference beams is identical through Fizeau optics 18 and collimator 16. Beamsplitter 14 then redirects the returned light to an interference pattern imaging apparatus 24 for display and analysis.

Fizeau interferometry, using the overall pattern of FIG. 1, is advantaged as a method for the interferometric surface inspection of precise spherical and nearly spherical surfaces because the Fizeau reference surface and the surface under test are within close proximity of each other. This reduces the likelihood of optical path disparities and helps to reduce retracing errors experienced by the light reflecting from the Fizeau reference surface and from the surface under test. Ideally, the interference that occurs during Fizeau interferometry only includes known errors on the Fizeau reference surface and errors on the surface under test, because all other sources of wavefront error are common to both paths.

The schematic diagram of FIG. 2 shows a function of Fizeau optics 18 for accurate surface measurement. Incoming light at L 1 is substantially planar, but must be redirected so that it arrives as spherical light at test surface 20, a spherical surface. Under the desired conditions for interferometry, as shown at enlargements E1 and E2, the light heading toward test surface 20, traced along exemplary rays R1, R2, R6, and R8 in FIG. 2, has a specific angular relationship to a reference surface 22. At any point along reference surface 22, this light that is directed toward the sample surface-under-test, that is, toward test surface 20, exits at a normal to surface 22. Reference surface 22 is also termed the Fizeau reference surface. In addition, when test surface 20 has the proper shape, the returning light, as test light, follows the exact same path and is incident on reference surface 22 at a normal. Reference light L2 that is reflected back from Fizeau reference surface 22 is also returned along the same path as the returning test light.

Fizeau objectives that deviate from perfect sphericity will cause the reference and test optical paths to vary slightly from one another upon return through the optical system, creating propagation errors. The greater the deviation of the wavefront from sphericity the greater the propagation error. Also, errors of larger slope, that is, of higher spatial frequency, will also cause similar propagation errors.

Complex optics designs are typically used to create a nearly perfect spherical wavefront from an incoming planar wavefront and to allow the spherical wavefront to be nearly perfectly normal to the Fizeau reference surface as described with reference to FIG. 2. For example, to bend the light to an appropriate angle $\theta$, as shown in FIG. 2, a number of conventional designs provide Fizeau objectives with as many as 4 or 5 or more lens elements, often where the numerical aperture is 0.5 or greater. Conventional solutions have not provided Fizeau interferometry systems that feature reduced parts count, smaller size, lower weight, and reduced cost, at the same time. At best, conventional solutions typically address one of these factors at the expense of others. For example, the use of one or more diffractive optical elements (DOE) has been proposed as one way to simplify lens design and reduce parts count. However, due to the relatively high cost and complexity of DOE device design itself, little or no cost advantage is obtained using this approach. As is well known to those familiar with optics fabrication, the complex lens optics conventionally used for Fizeau interferometry require considerable expense and skill in manufacturing and assembly. Even the slightest errors in surface quality, thickness, radius, and alignment can have a significant effect on the measurement accuracy of these optical assemblies.

The use of an aspheric lens component is one solution that has been advanced for reducing the number of lens elements in the Fizeau optics. For example, commonly assigned U.S. Pat. No. 5,797,493 entitled "Interferometer with Catadioptric Imaging System Having Expanded Range of Numerical Aperture" to Vankerkhove disclosed the use of one or more aspheric lenses in the optical path of a Fizeau interferometer that has refractive elements and a curved reflective surface for beam direction. Similarly, U.S. Pat. No. 7,342,667 entitled "Method of Processing an Optical Element Using an Interferometer Having an Aspherical Lens That Transforms a First Spherical Beam Type into a Second Spherical Beam Type" to Freimann et al. discloses the use of one or more aspheric lenses in a Fizeau interferometer that uses refractive elements.

Although aspheric lenses are known to offer certain advantages, however, there can be practical hurdles that complicate their deployment or diminish their usefulness in various different applications. The need for precision fabrication, testing, and validation of the aspheric surface is a widely recognized problem to the optics designer and can present complex difficulties that are not easily or inexpensively addressed. In the '667 Freimann et al. patent, for example, a second interferometer apparatus is used in order to characterize or calibrate the aspheric lens for its use in a first interferometer apparatus. Design and use of a special-purpose second interferometer as a test fixture for using an aspheric lens in a first interferometer is a costly solution that adds time and complexity to interferometer manufacture, substantially eroding many of the potential advantages of using an aspheric lens in the first place.

Thus, it can be seen that there would be significant advantages to apparatus and methods for inexpensively testing and using an aspheric lens, thereby reducing parts count, size, and complexity of Fizeau interferometry optics.

SUMMARY

It is an object of the present invention to advance the art of optical measurement instrumentation. With this object in mind, the present invention provides an imaging system for obtaining interferometric measurements from a sample spherical surface, comprising:

a light source for providing an incident light beam;

a beamsplitter disposed to direct the incident light beam toward the sample spherical surface and to direct a test light reflected from the sample spherical surface and a reference light reflected from a reference spherical surface toward an interferometric imaging apparatus;

a lens assembly in the path of the incident light beam and comprising at least one lens element, wherein one of the at least one lens elements has an aspheric surface and wherein one of the at least one lens elements further provides the reference spherical surface facing the sample spherical surface; and a reference plate that is temporarily disposed in the path of the incident light beam for measuring the aspheric surface itself and that is removable from the path of the incident light beam for obtaining interferometric measurements from the sample spherical surface.

It is a feature of the present invention that it employs an aspherical surface within the objective lens of Fizeau interferometer optics.

It is an advantage of the present invention that it provides interferometry optics solutions capable of having reduced parts count.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 6A is a close-up of optical elements in the test setup of FIG. 5A;

FIG. 6B is a close-up of optical elements in the test setup of FIG. 5B; and

DETAILED DESCRIPTION

Figure 1:
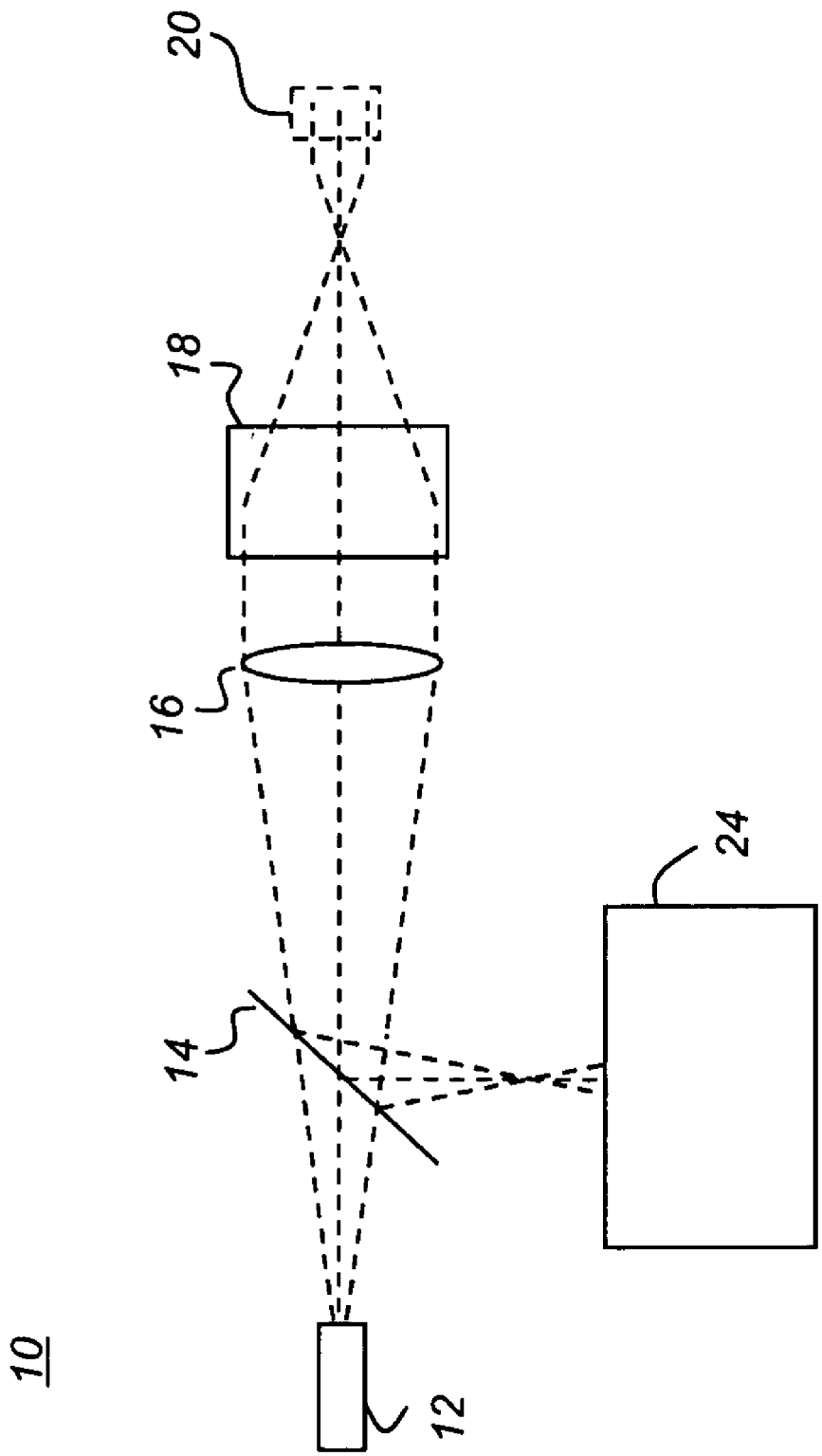
FIG. 1 is a block diagram of a Fizeau interferometer.

It is to be understood that elements not specifically shown or described may take various forms well known to those skilled in the art. For example, conventional interferometer beam-generating, beamsplitting, and collimation optics, and techniques for handling and interpreting the interference patterns obtained from test and reference light are well known to those skilled in the optical metrology art and, unless related to changes effected by methods and apparatus of the present invention, are not described herein.

Figures shown and described herein are provided in order to illustrate key principles of operation and component relationships along their respective optical paths according to the present invention and are not drawn with intent to show actual size or scale. Some exaggeration may be necessary in order to emphasize basic structural relationships or principles of operation. Some conventional components that would be needed for implementation of the described embodiments, such as various types of optical mounts, for example, are not shown in the drawings in order to simplify description of the invention itself. In the drawings and text that follow, like components are designated with like reference numerals, and similar descriptions concerning components and arrangement or interaction of components already described are omitted.

A distinction may be made between spherical and planar with respect to light provided in various embodiments and with respect to surface shapes of optical components. However, it is known that a planar light can be considered to be a type of spherical light, that is, spherical light having a radius of curvature that is considered to be at infinity.

The term "oblique angle", as used in the present disclosure, describes an angle that is other than normal, that is, other than an integral multiple of 90 degrees.

Figure 2:
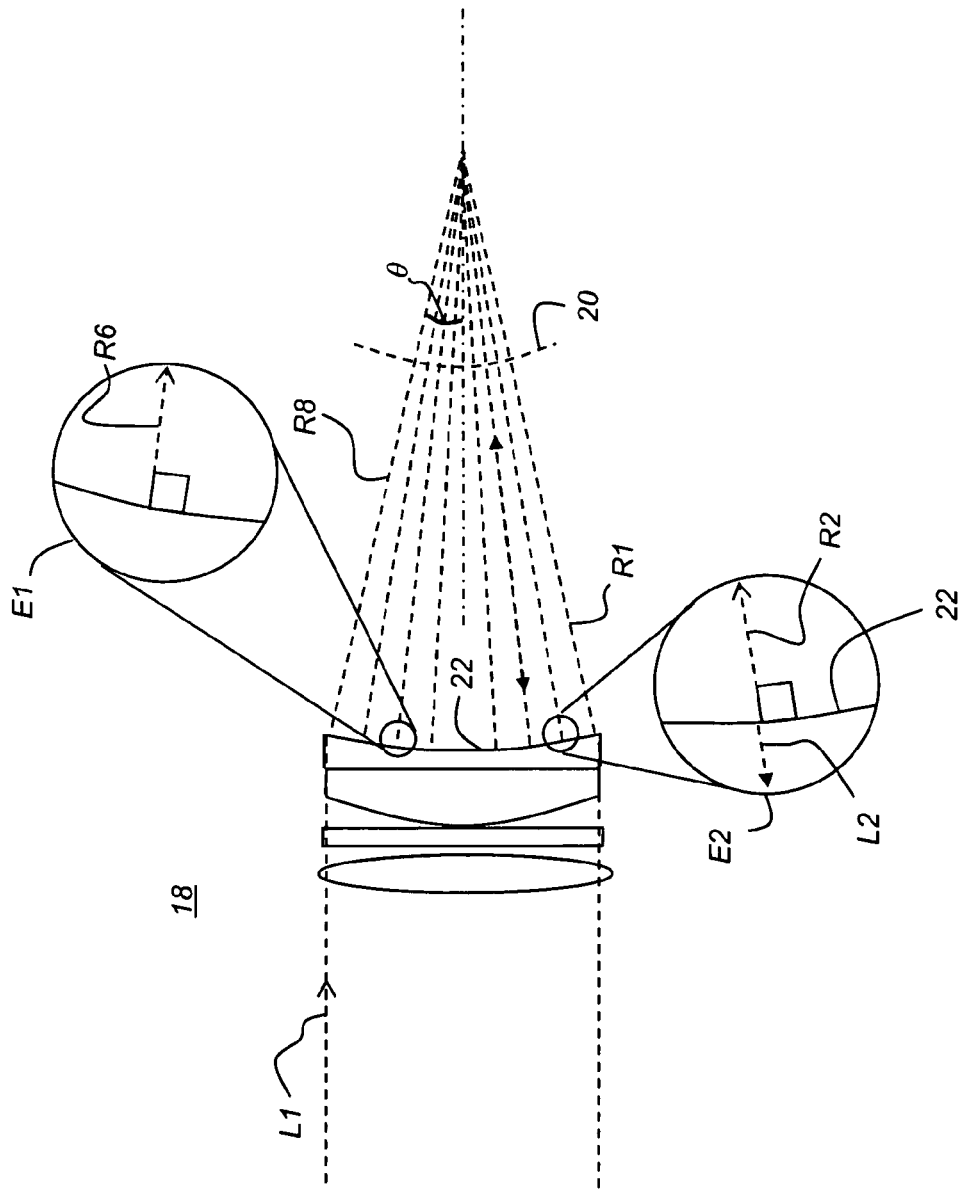
FIG. 2 is a schematic block diagram that shows the path of light at the reference surface of Fizeau interferometer optics.

Embodiments of the present invention provide the light bending (to angle $\theta$, as shown in FIG. 2) that is required for Fizeau interferometry using a lens element that has an aspheric surface and a spherical surface, singly, or in combination with other lens elements. In addition, embodiments of the present invention provide a mechanism for facilitating testing and validation of the aspheric surface without requiring that a separate test fixture be designed and fabricated.

Figure 3:
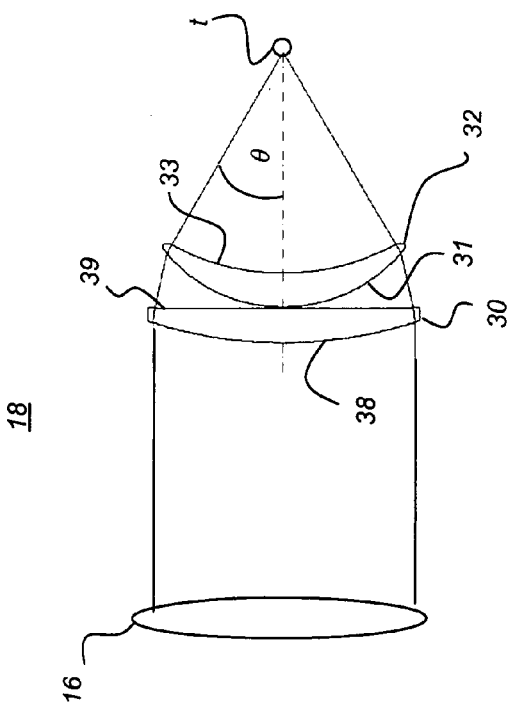
FIG. 3 is a block diagram showing a Fizeau optical assembly having aspheric and spherical lenses.

Referring to the schematic diagram of FIG. 3, an embodiment of Fizeau optics 18 has a lens assembly that redirects an incident collimated light from collimator 16 toward a focal point, shown as target t, at angle $\theta$. In this embodiment, a lens element 30 in the lens assembly has an aspherical surface at surface 38 and a surface 39 that is spherical. A spherical lens element 32, has surfaces 31 and 33. Lens element 33 provides the reference spherical surface that faces the sample spherical surface for Fizeau measurement. This embodiment uses only two optical elements and has a numerical aperture of 0.5, providing an f/1.0 Fizeau objective. It should be observed that there are other embodiments in which the aspherical surface is one of the other surfaces 31 or 39 of the lens assembly.

It can be appreciated that there would be advantages to embodiments that use a single aspheric lens, rather than using an aspheric lens in combination with one or more spherical lenses. The additional optics may be necessary, however, in order to increase the overall cone angle (shown in these figures as angle $\theta$) when the desired angle cannot be achieved using a singlet solution.

Figure 4:
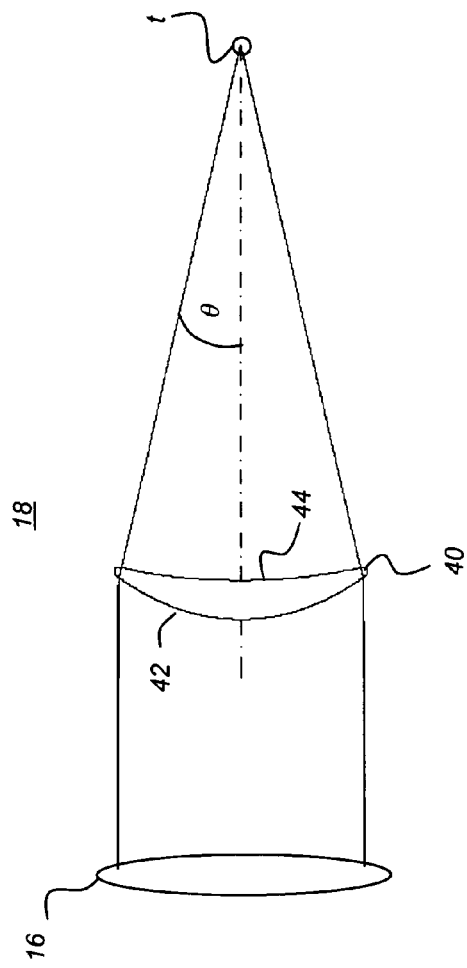
FIG. 4 is a block diagram showing a Fizeau optical assembly having a single aspheric lens.

There can be, however, applications in which a singlet solution is possible. FIG. 4 shows an alternative Fizeau optics arrangement using a single aspherical lens element 40. Lens element 40 receives the collimated light at its aspheric surface 42 and directs the focused light from a spherical surface 44 toward the test target at the needed normal angle described earlier with reference to FIG. 2. A single-element design of this type has a numerical aperture of 0.21 and provides an f/2.3 Fizeau objective.

The aspheric solutions shown in FIGS. 3 and 4 reduce the parts count, hence size and weight, of Fizeau optics and can provide improved performance over standard designs that use spherical lenses. However, as is well known to those skilled in the optical design arts, the jobs of testing and validation of an aspheric surface, at the accuracy needed, can present significant challenges. In conventional practice, for example, specially designed correction optics such as reflective, refractive, or diffractive "null" lenses or null correctors are typically used for asphere testing and a separate test fixture, such as a separate interferometer, is used. The development of specialized lenses and testing equipment, however, can add considerably to the time and expense required for asphere fabrication.

The apparatus and methods of the present invention address the problem of aspheric use and testing for an interferometer by providing a way to test the aspheric surface directly in the interferometer itself. That is, in embodiments of the present invention, components of the Fizeau objective can advantageously be used as the test fixture apparatus for test of the asphere surface of lens element 30 (FIG. 3) or of lens element 40 (FIG. 4). Moreover, this same test apparatus arrangement can also be used to measure other problems that exist in the optical path.

Figure 5A:
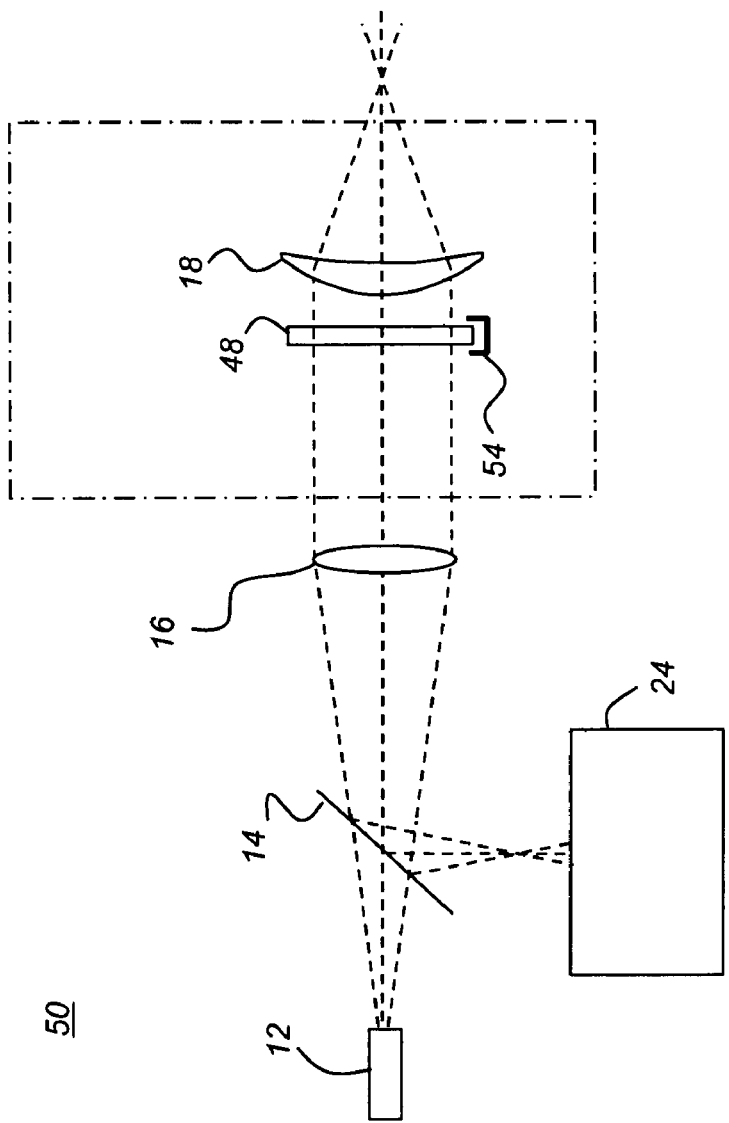
FIG. 5A is a schematic diagram showing a test setup for measuring the aspheric Fizeau objective in a single-lens embodiment.

Referring to FIG. 5A, there is shown a test apparatus 50 that is formed by adding a planar reference plate 48 to the interferometer system described earlier. Components shown outside the dashed box are those parts of the interferometer that provide incident collimated light that is directed toward the test surface and read back the test and reference light signals in conventional use. A mount 54 is added to the interferometer components, provided for temporarily seating reference plate 48 in position as part of this test setup. Reference surface 48, slightly wedge-shaped as shown in the enlarged view of FIG. 6A, is positioned between the aspheric lens element of Fizeau optics 18 and the source of collimated light from upstream optics in the interferometer. The wedge shape provides a slight tilt to a surface 51, the first surface that receives incident collimated light, so that this surface is oblique to the incident light and deflects unwanted back-reflection from this surface away from the signal path; any detected back reflection from this surface could interfere with the signals of interest.

For measurement of aspheric surface 42 using test apparatus 50 in FIGS. 5A and 6A, an interference pattern is obtained by a combination of the reference reflected light (Ref) reflected back from a reference surface 52 with test reflected light (Test) that is reflected back from spherical surface 44.

Figure 5B:
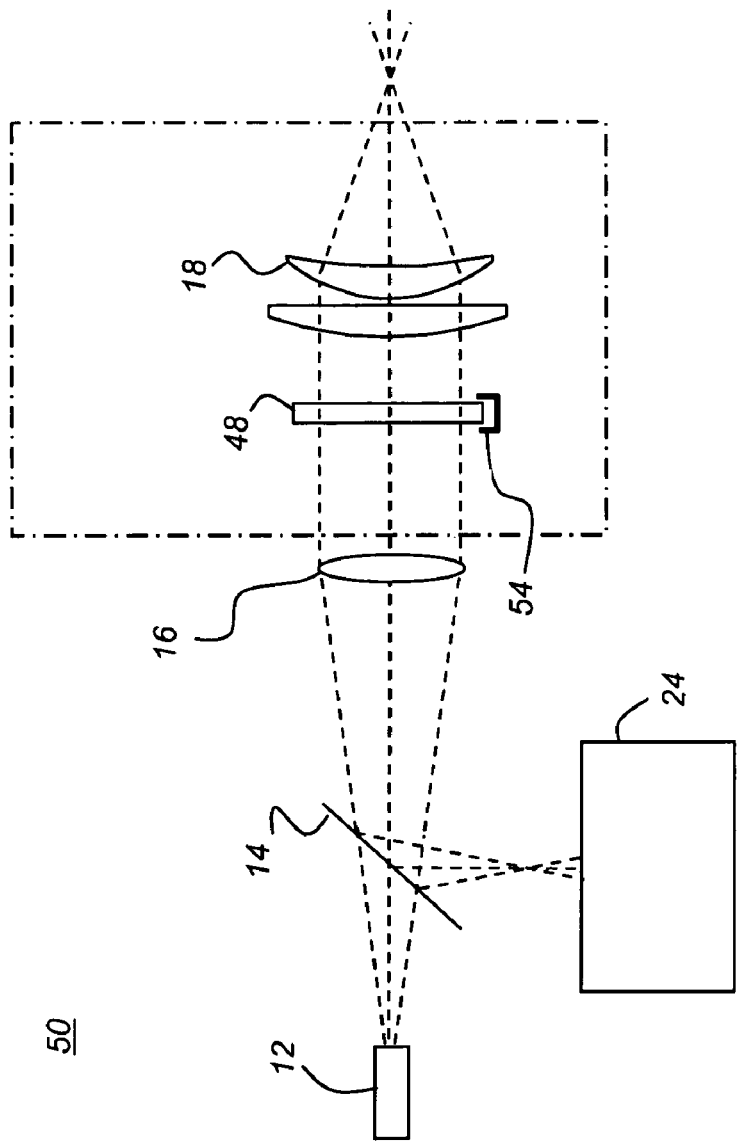
FIG. 5B is a schematic diagram showing a test setup for measuring the aspheric Fizeau objective in a multi-lens embodiment.

FIGS. 5B and 6B show the similar test apparatus 50 arrangement that is used for a more complex embodiment in which Fizeau lens 18 has one or more lens elements in addition to the aspherical lens, shown in these examples as lens 30. It can be appreciated that this embodiment adds another level of testing capability, since the optical path of the test reflected light includes the additional lens surfaces and, therefore, allows correction or compensation for problems caused by imperfections in these surfaces or their materials. For example, the test setup of FIG. 6B can help to measure other optical factors in addition to aspheric curvature, such as inhomogeneity of the lens material for either lens, surface contour, lens radii, lens center thickness, and airspace errors between lens elements.

As with other interferometry methods, the arrangements shown in FIGS. 5A-6B eliminate the need to profile aspheric surface 42 or, for alternate embodiments, the appropriate aspheric surface 31, 38, or 39 directly, such as using contact profile methods. Instead, this measurement method uses the handling of light by lens element 18 and spherical waves as well as the support image processing components of the interferometer itself to ascertain surface shape and quality for the aspherical surface as it is being formed and finished. An iterative process of shaping and testing can then be followed to achieve the proper aspherical surface that is needed, including providing a surface that corrects for other defects in the Fizeau optics, as described with reference to the FIG. 5B/6B embodiment. Reference plate 48 can then be removed from mount 54 once Fizeau lens 18 is suitably formed and is ready for use in interferometry.

This straightforward method for aspheric testing can then be used in conjunction with any of a number of suitable techniques for asphere fabrication, including, for example, magnetorheological finishing (MRF), computer-controlled polishing, and ion beam figuring. These techniques, known to those skilled in the optical fabrication and metrology arts, allow deterministic forming and finishing of a high-quality aspheric surface.

Figure 7:
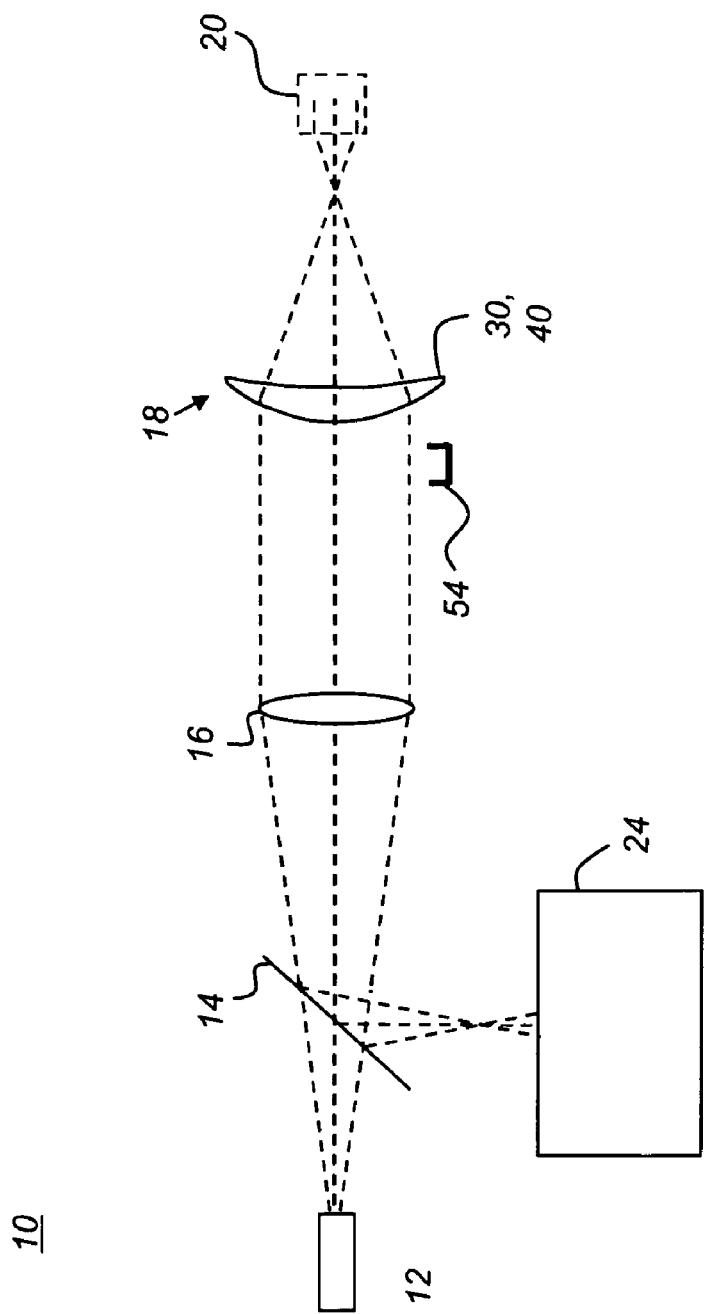
FIG. 7 is a schematic block diagram showing a Fizeau interferometer according to an embodiment of the present invention.

Referring to FIG. 7, the interferometer 10 apparatus of the present invention allows one or more aspheric lenses 30, 40 to be used directly as the Fizeau lens 18 of the interferometer or at another suitable point along the optical path for measuring the sample spherical surface of test surface 20. Embodiments of the present invention further allow testing of the aspheric surfaces of lenses 30, 40 to help in surface fabrication.

Aspheric lens elements themselves can be formed from any suitable material, such as various types of glass or polymer. In general, high-index optical glasses are well suited for use as the aspheric lens.

Any of a number of suitable finishing techniques can be used in final surface preparation of the Fizeau optics of the present invention. For example, finishing processes can include polishing or application of a coating, such as a partially reflective coating, anti-reflective coating, or protective coating.

The interferometry apparatus of the present invention is capable of measurement for planar and spherical surfaces and is particularly well-suited for measurement applications of larger diameter lenses. As was noted earlier, the planar surface can be considered to be a special type of spherical surface, for the case in which the radius of curvature is effectively at infinity.

Unlike earlier solutions that require fabrication of a separate interferometer for testing and validating the aspheric surface, the method and apparatus of the present invention use the interferometer itself as the "test fixture" needed for aspheric surface testing. The only change required to interferometer components is the addition of reference plate 48 to the optical path, whether the reference plate is provided a temporary mounting bracket or fixture within the interferometer for this purpose, or whether an external mechanical device is temporarily provided for positioning the reference plate appropriately while the aspheric surface is checked. That is, the reference plate can be mechanically pivoted or otherwise disposed in place as needed, without the requirement for a separate mount 54.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, light source 12 can be a laser or laser diode, other solid-state light source that provides an incident light beam. Collimator 16 is an optional component and can be formed from a single lens element or from multiple refractive or reflective optical components. Any of a number of different types of lens mounts or brackets could be used as mount 54, including those that would allow reference plate 48 to be pivoted or otherwise temporarily moved into place in the optical path from outside the interferometer during device manufacture, so that no additional built-in fixture is needed in the interferometer hardware.

Thus, what is provided is an apparatus and method for design of an aspheric lens for providing a spherical waveform in a Fizeau interferometer.

The invention claimed is:

1. An imaging system for obtaining interferometric measurements from a sample spherical surface, comprising:
   a light source for providing an incident light beam;
   a beamsplitter disposed to direct the incident light beam toward the sample spherical surface and to direct a test light reflected from the sample spherical surface and a reference light reflected from a reference spherical surface toward an interferometric imaging apparatus;
   a lens assembly in the path of the incident light beam and comprising at least one lens element, wherein one of the at least one lens elements has an aspheric surface and wherein one of the at least one lens elements further provides the reference spherical surface facing the sample spherical surface; and
   a reference plate that is disposed in the path of the incident light beam for measuring the aspheric surface.

2. The imaging system of claim 1 wherein the light source is a laser.

3. The imaging system of claim 1 further comprising:
   a collimator in the path of the incident light beam.

4. The imaging system of claim 1 wherein a single lens element provides both the aspheric surface and the reference spherical surface.

5. The imaging system of claim 1 wherein a first lens element provides the aspheric surface and a second lens element provides the reference spherical surface.

6. The imaging system of claim 1 wherein the reference plate provides a reference surface and an incident surface, wherein the incident surface is at an oblique angle with respect to the incident light beam.

7. A method for measuring an aspheric surface for a lens element comprising:
   a) disposing a reference plate and the lens element along an optical axis, with the aspheric surface facing toward a source of incident light from along the optical axis;
   b) preparing the final aspheric surface by one or more iterations of:
      (i) directing a collimated beam through a reference plate and through the aspheric surface;
      (ii) obtaining a reference reflected light back along the optical axis from the reference plate;
      (iii) obtaining a test reflected light from a spherical surface of the lens element;
      (iv) directing the reference and test reflected light to an interferometric imaging apparatus;
      (v) performing a finishing operation on the aspheric surface according to results from the interferometric imaging apparatus;
      and
   c) removing the reference plate.

8. The method of claim 7 wherein the finishing operation is taken from the group consisting of magnetorheological finishing (MRF), computer-controlled polishing, and ion beam figuring.

9. A method for forming a lens element within an interferometer, the lens element having an aspherical surface, the method comprising:
   a) disposing the lens element as part of interferometer optics along an optical axis of the interferometer;
   b) disposing a wedge-shaped reference plate along the optical axis of the interferometer between the lens element and a light source;
   c) preparing the aspheric surface of the lens element by one or more iterations of:
      (i) directing a collimated beam from the light source through the reference plate and through the aspheric surface of the lens element;
      (ii) obtaining a reference reflected light from a flat surface of the reference plate;
      (iii) obtaining a test reflected light from a spherical reference surface of the interferometer optics;
      (iv) directing the reference reflected light and test reflected light to an interferometric imaging apparatus;
      (v) performing a finishing operation on the aspheric surface of the lens element according to results from the interferometric imaging apparatus;
      and
   d) removing the reference plate from the optical axis of the interferometer.

10. The method of claim 9 wherein the lens element is a first lens element and wherein the interferometer optics further comprises at least a second lens element and wherein the spherical reference surface that provides the test reflected light is part of the second lens element.

* * * * *